(12) United States Patent
King et al.

(10) Patent No.: US 11,079,054 B2
(45) Date of Patent: Aug. 3, 2021

(54) CROSS-OVER FLUID COUPLING

(71) Applicant: ATOMIC ENERGY OF CANADA LIMITED, Chalk River (CA)

(72) Inventors: James M. King, Deep River (CA); Andrew B. Kittmer, Deep River (CA); Terry J. Schaubel, Deep River (CA)

(73) Assignee: Atomic Energy Of Canada Limited, Chalk River (CA)

( * ) Notice: Subject to any disclaimer, the term of this patent is extended or adjusted under 35 U.S.C. 154(b) by 179 days.

(21) Appl. No.: 15/735,374

(22) PCT Filed: Jun. 22, 2016

(86) PCT No.: PCT/CA2016/050728
§ 371 (c)(1),
(2) Date: Dec. 11, 2017

(87) PCT Pub. No.: WO2016/205937
PCT Pub. Date: Dec. 29, 2016

(65) Prior Publication Data
US 2018/0356021 A1 Dec. 13, 2018

Related U.S. Application Data

(60) Provisional application No. 62/183,447, filed on Jun. 23, 2015.

(51) Int. Cl.
*F16L 39/00* (2006.01)
*F16L 9/19* (2006.01)
(Continued)

(52) U.S. Cl.
CPC .............. *F16L 39/005* (2013.01); *F16L 9/19* (2013.01); *F16L 9/20* (2013.01); *F28D 7/106* (2013.01);
(Continued)

(58) Field of Classification Search
CPC .......... F16L 9/19; F16L 39/005; G21C 21/00; G21C 15/02; F28D 7/106; F28F 9/26; F28F 2250/10
(Continued)

(56) References Cited

U.S. PATENT DOCUMENTS 2,832,374 A 4/1958 November
3,323,604 A 6/1967 Henderson
(Continued)

FOREIGN PATENT DOCUMENTS

DE 7725501 U1 5/1978
WO 2011/119198 A1 9/2011
(Continued)

OTHER PUBLICATIONS

International Search Report, dated Aug. 25, 2016, PCT/CA2016/050728.
(Continued)

*Primary Examiner* — Zachary T Dragicevich
(74) *Attorney, Agent, or Firm* — Kevin Shipley; Fogler, Rubinoff LLP

(57) ABSTRACT

A cross-over fluid coupling includes a first coupling end and a second coupling end. A plurality of first conduits have inner ends disposed toward the first coupling end and outer ends spaced apart from the inner end toward the second coupling end and being outboard of the inner end. A plurality of second conduits have outer ends that are disposed toward the first coupling end and positioned laterally outboard of the inner end of at least one of the first conduits, and inner ends that are spaced apart from the outer end toward the
(Continued)

second coupling end in the axial direction and is laterally inboard of the outer end of the at least one of the first conduits.

24 Claims, 9 Drawing Sheets

(51) Int. Cl.
F28F 9/26 (2006.01)
F28D 7/10 (2006.01)
F28F 13/06 (2006.01)
G21C 3/322 (2006.01)
G21C 15/02 (2006.01)
G21C 3/328 (2006.01)
G21C 1/20 (2006.01)
G21C 21/00 (2006.01)

(52) U.S. Cl.
CPC ............... *F28F 9/26* (2013.01); *F28F 13/06* (2013.01); *G21C 3/322* (2013.01); *G21C 15/02* (2013.01); F28F 2250/04 (2013.01); F28F 2250/10 (2013.01); G21C 1/20 (2013.01); G21C 3/328 (2013.01); G21C 21/00 (2013.01)

(58) Field of Classification Search
USPC ......... 285/123.1, 123.2, 124.1; 138/111, 114
See application file for complete search history.

(56) References Cited

U.S. PATENT DOCUMENTS

| 3,873,135 | A | * | 3/1975 | Kreitzberg | 285/124.1 X |
| 4,157,194 | A | * | 6/1979 | Takahashi | 138/114 X |
| 4,529,009 | A | * | 7/1985 | Horner | 138/111 |
| 4,826,653 | A | | 5/1989 | Nylund et al. | |
| 4,963,420 | A | * | 10/1990 | Jarrin | F16L 9/19 138/111 X |
| 5,364,377 | A | | 11/1994 | O'Neil | |
| 6,302,448 | B1 | * | 10/2001 | Van Der Meer | 285/123.1 X |
| 2013/0276436 | A1 | * | 10/2013 | Jensen | F16L 9/19 138/114 X |
| 2014/0270739 | A1 | * | 9/2014 | Rosvold | F16L 9/19 |

FOREIGN PATENT DOCUMENTS

WO 2013/185232 A1 12/2013
WO 2016/205937 A1 12/2016

OTHER PUBLICATIONS

Written Opinion of the International Search Authority, dated Aug. 25, 2016, PCT/CA2016/050728.
International Preliminary Report on Patentability, dated Dec. 26, 2017, PCT/CA2016/050728.

* cited by examiner

CROSS-OVER FLUID COUPLING

CROSS-REFERENCE TO RELATED APPLICATIONS

This is a national stage application of International Application No. PCT/CA2016/050728 filed Jun. 22, 2016, which claims priority to U.S. Provisional Patent Application 62/183,447 filed Jun. 23, 2015, and the entire contents of each are hereby incorporated herein by reference.

FIELD

The present subject matter of the teachings described herein relates generally to a cross-over fluid coupling for connecting first and second sets of pipes.

BACKGROUND

WO 2013/185232 discloses a fuel channel assembly for a nuclear reactor that includes an inner conduit received within an outer conduit that has an outer upper end connectable to a coolant outlet and an outer lower end. The inner conduit may have an inner upper end connectable to a coolant source and an inner lower end axially spaced apart from the inner upper end and disposed within the outer conduit to enable coolant to circulate from the coolant source to the coolant outlet through both the inner and outer conduits. A fuel bundle chamber may be between an inner surface of the outer conduit and an outer surface of the inner conduit and may at least partially laterally surround the inner conduit. The fuel bundle chamber fluidly connecting the inner lower end and the outer upper end to enable the coolant to flow upward through the fuel bundle chamber.

U.S. Pat. No. 4,826,653 discloses a fuel assembly for a boiling water reactor with at least one vertical channel for a by-pass flow through the fuel assembly. The channel is supplied with water through a vertical supply tube surrounded by the base of the assembly, the supply tube being arranged with its lower end in the vicinity of the lower end of the base.

U.S. Pat. No. 5,364,377 discloses a fluid coupling for connecting a plurality of fluid sources to a single-bore outlet member, said coupling comprising a plurality of tubes mutually conjoined within a connector for attachment of said outlet member, each said tube extending through said connector to terminate at a point which is substantially contiguous with said outlet member when attached to said connector, the lumens of each said tube being mutually isolated by the tube walls until the termination of the tubes at said point, whereby in use of said fluid coupling with said single-bore outlet member connected thereto, fluid passing down any of said tubes discharges from the end of the respective tube substantially directly into the bore of said outlet member.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In some fluid handling systems a piping arrangement can include a set of nested pipes/tubes in which each pipe carries a separate fluid stream. For example, the system can include two concentric pipes with one fluid stream flowing through the interior of the inner pipe and a separate fluid stream flowing through the outer flow area defined between the inner and outer pipes (i.e. between the outer surface of the inner pipe and the inner surface of the outer pipe). If the pipes are circular and are arranged coaxially with each other, the interior of the inner pipe may have a generally circular inner flow area, and the outer flow area may have a generally annular configuration.

The fluid streams may be liquids, gases, supercritical fluids and any combination thereof. In some circumstances it may be desirable or necessary to switch the positions of the two fluid streams, such that the fluid stream that was originally flowing through the interior of the inner pipe is re-directed to flow through the annular outer flow area, and the fluid stream that was originally flowing within the annular flow area is re-directed to flow through the inner pipe. In some configurations, the switching of the fluid streams may be done to help facilitate connecting the fluid streams to other components and/or fluid streams in an industrial process.

In accordance with one broad aspect of the teachings disclosed herein, a cross-over fluid coupling may include a first coupling end and a second coupling end spaced apart from the first coupling end in an axial direction. A plurality of first conduits may extend between the first and second coupling ends. Each first conduit may have an inner end disposed toward the first coupling end and an outer end spaced apart from the inner end toward the second coupling end in the axial direction and being outboard of the inner end in a lateral direction that is orthogonal the axial direction. A plurality of second conduits may extend between the first coupling end and the second coupling end. Each second conduit may have an outer end that is disposed toward the first coupling end and is positioned radially outboard of the inner end of at least one of the first conduits, and an inner end that is spaced apart from the outer end toward the second coupling end in the axial direction and is radially inboard of the outer end of the at least one of the first conduits.

The outer end of a first one of the first conduits may at least partially surrounds the inner end of a first one of the second conduits.

The outer end of the first one of the first conduit partially surrounds the inner end of the first one of the second conduits and the inner end of a second one of the second conduits.

The coupling may include a central coupling axis and a first plane containing the central coupling axis intersects the first one of the first conduits and does not intersect the first one of the second conduits.

The first plane may be a plane of symmetry for the first one of the first conduits.

The coupling may also include a second plane containing the central coupling axis, and the second plane may intersect the first one of the second conduits while not intersecting the first one of the first conduits.

The second plane may be a plane of symmetry for the first one of the second conduits.

The second plane may intersect the first plane at an intersection angle that is between about 20 degrees and about 90 degrees.

Optionally, there may be n first conduits and n second conduits. The first conduits may be substantially identical and the second conduits may be substantially identical. Each of the first and second conduits, for a least a major part of the length thereof, may be a cross-section in a plane orthogonal to the axial direction, extends through 360/n degrees.

The intersection angle may be 180/n degrees.

The inner ends of the plurality of first conduits may be nested laterally between the outer ends of the plurality of second conduits.

The inner ends of the plurality of second conduits may be nested laterally between the outer ends of the plurality of first conduits.

The outer end of each second conduit may at least partially surround the inner ends of at least two of the first conduits, and the outer end of each first conduit may at least partially surrounds the inner ends of at least two of the first conduits.

The outer ends of the first and second conduits may be each generally arcuate in shape. The outer ends of the first conduits may co-operate with each other to define a first generally annular outer ring area, and the outer ends of the second conduits may co-operate with each other to define a second generally annular outer ring area.

The outer end of each second conduit may at least partially surround the inner ends of at least two of the first conduits.

The outer ends of the first conduits may each be generally arcuate in shape and may co-operate with each other to define a generally annular outer ring area.

Each of the first conduits may be substantially identical to each other.

Each of the second conduits may be substantially identical to each other.

The plurality of first conduits may be substantially identical to each other and to the plurality of second conduits, and the plurality of second conduits may be oriented 180 degrees relative to the plurality of first conduits.

The coupling may include a first flange disposed at the first coupling end and retaining the inner ends of the first conduits and the outer ends of the second conduits, and a second flange disposed at the second coupling end and retaining the outer ends of the first conduits and the inner ends of the second conduits.

The plurality of first conduits may be laterally spaced apart from each other and from the plurality of second conduits whereby gaps are provided between adjacent ones of the first and second conduits.

The coupling may include a generally cylindrical outer sheath laterally surrounding the plurality of first conduits and the plurality of second conduits.

The first conduit may have a first cross-sectional area taken in a first plane orthogonal to the axial direction at first location, a second cross-section area in a second plane orthogonal to the axial direction at a second location, and a third cross-sectional area taken in a third plane orthogonal to the axial direction at a location axially between the first location and the second location. The third cross-sectional area may be different than at least one of the first cross-sectional area and the second cross-sectional area.

The third cross-sectional area may be smaller than the first cross-sectional area and the second cross-sectional area.

The third cross-sectional area may be disposed closer to the inner ends of the first conduits than the outer ends of the first conduits.

The first cross-sectional area may be at the first coupling end and the second cross-sectional area is may be at the second coupling end. The first cross-sectional area may have a first shape and the second cross-sectional area may have a different second shape.

The inner end of a first one of the first conduits may have a first cross-sectional area, the outer end of a first one of the second conduits may have a second cross-sectional area, and the first cross-sectional area may be between about 50% and 110% of the second cross-sectional area.

The coupling may include a reference plane that is orthogonal to the axial direction and disposed between the first coupling end and the second coupling end and each first conduit may have a respective first reference cross-sectional area taken in the reference plane and all of the first reference cross-sectional areas may be equal to each other.

Each second conduit may have a respective second reference cross-sectional area taken in the reference plane and all of the second reference cross-sectional areas may be equal to each other.

The first reference cross-sectional areas may be equal to the second reference cross-sectional areas.

The reference plane may be equally spaced axially between the first coupling end and the second coupling end.

In accordance with another broad aspect of the teachings described herein, which may be used alone or in combination with any other aspects, a cross-over fluid coupling may be provided for connecting a first set of pipes, having a first inner pipe and a first outer pipe at least partially surrounding the first inner pipe, to a second set of pipes, having a second inner pipe and a second outer pipe at least partially surrounding the second inner pipe. The coupling may include a first coupling end connectable to the first set of pipes, and a second coupling end connectable to the second set of pipes and spaced apart from the first coupling end in an axial direction. A plurality of first conduits may extend between the first and second coupling ends. Each first conduit may have a first end fluidly connectable to the first outer pipe and a second end that is spaced apart from the first end toward the second coupling end in the axial direction and is fluidly connectable to the second inner pipe to fluidly connect the first outer pipe to the second inner pipe. A plurality of second conduits may extend between the first coupling end and the second coupling end. Each second conduit may have a first end that is connectable to the first inner pipe and a second end that is spaced apart from the first end toward the second coupling end in the axial direction and is connectable to the second outer pipe to fluidly connect the first inner pipe to the second outer pipe.

The coupling may include three first conduits and three second conduits arranged in an alternating configuration with each other.

The first ends of the first conduits may laterally surround the first ends of the second conduits.

The plurality of first conduits may be identical to each other and to the plurality of second conduits, and the second conduits may be oriented 180 degrees relative to the first conduits.

The second ends of the plurality of first conduits may co-operate with each other to define a substantially circular second end inner flow area.

The second ends of the plurality of second conduits may co-operate with each other to define a substantially annular first end outer ring flow area laterally surrounding the second end inner flow area.

The first ends of the plurality of second conduits may co-operate with each other to define a substantially circular first inner flow area and the first ends of the first conduits may co-operate with each other to define a generally annular first outer ring flow area surrounding the first inner flow area.

Fluid flowing through one of the first conduits may define a plurality of flow direction vectors at a plurality of spaced apart axial locations along a length of the one of the first conduits. Each flow direction vector may be taken at geometric centre point of the one of the first conduit at each axial location and all of the flow vectors may be at an angle of less than about 25 degrees relative to the axial direction.

DRAWINGS

The drawings included herewith are for illustrating various examples of articles, methods, and apparatuses of the teaching of the present specification and are not intended to limit the scope of what is taught in any way.

DETAILED DESCRIPTION

Figure 1:
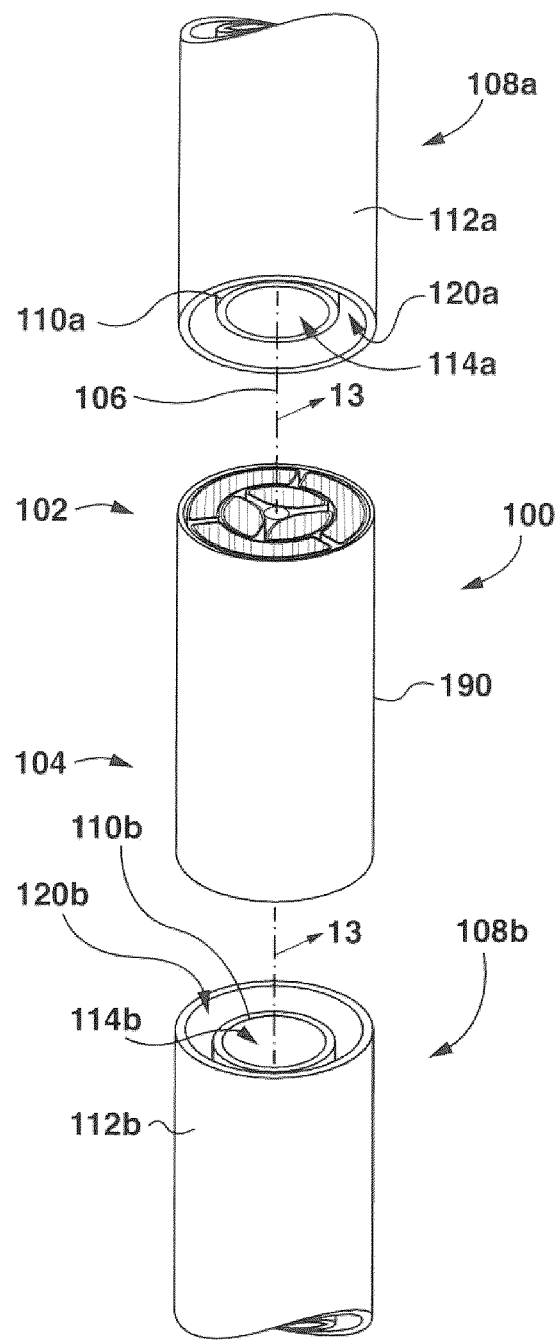
FIG. 1 is a perspective view of one example of a cross-over fluid coupling.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

In some fluid handling systems a piping arrangement can include a set of nested pipes/tubes in which each pipe carries a separate fluid stream. For example, the system can include two concentric pipes with one fluid stream flowing through the interior of the inner pipe and a separate fluid stream flowing through the outer flow area defined between the inner and outer pipes (i.e. between the outer surface of the inner pipe and the inner surface of the outer pipe). If the pipes are circular and are arranged coaxially with each other, the interior of the inner pipe may have a generally circular inner flow area, and the outer flow area may have a generally annular configuration.

The fluid streams may be liquids, gases, supercritical fluids and any combination thereof. In some circumstances it may be desirable or necessary to switch the positions of the two fluid streams, such that the fluid stream that was originally flowing through the interior of the inner pipe is re-directed to flow through the annular outer flow area, and the fluid stream that was originally flowing within the annular flow area is re-directed to flow through the inner pipe. In some configurations, the switching of the fluid streams may be done to help facilitate connecting the fluid streams to other components and/or fluid streams in an industrial process.

To help facilitate such a switch, a cross-over fluid coupling can be provided in the piping system, and optionally can be provided between two sections or lengths of the nested pipes. In some configurations, the nested pipes at both ends of the cross-over fluid coupling may have the same configuration. Alternatively, nested pipes connected to one end of the cross-over fluid coupling may have different configuration than the nested pipes connected to the other end of the cross-over fluid coupling (e.g. may have different shapes, flow areas, sizes, etc.).

Optionally, the cross-over fluid coupling can be configured to facilitate switching of the fluid streams while maintaining the separation between the streams (i.e. switching of the fluid streams is achieved without mixing the two fluid streams). Optionally, the cross-over fluid coupling may be configured to help reduce heat transfer between the fluid streams (such as by providing thermal insulating between the streams), or alternatively may be configured to help promote heat transfer between the streams.

One example of an industrial process that utilizes a system of nested, concentric pipes and requires that the fluid flows within the pipes switch positions is the fuel channel arrangement of the Canadian Generation IV supercritical heavy water nuclear reactor, for example as described in International Patent Application Publication No. WO2013185232 for A Pressure Tube Nuclear Reactor with a Low Pressure Moderator and Fuel Channel Assembly, the entirety of which is incorporated herein by reference. In such a design, the flow of coolant into and out of the fuel channel occurs at a single end (i.e. the top) of the fuel channel conduits. In the upper portions of the fuel channel, the cooler inlet coolant flow is arranged in the outer annular area between the concentric pipes and is flowing downwardly into the reactor core, while the heated, outlet coolant flow is travelling upwardly in the inner pipe. However, in the lower portion of the fuel channel (i.e. in the reactor core) the cooler inlet coolant flow is required to flow downwardly through the interior of the inner pipe, while the heated, outlet coolant flow flows upwardly through the annular area between the pipes, which contains the fuel bundles. At the interface between the upper and lower portions of the fuel channel the coolant fluid flow paths cross each other, optionally without mixing and with a relatively lower amount of heat transfer between the incoming and outgoing coolant streams.

Some existing fittings that can be configured to cross-over the coolant flows may exhibit one or more limitations such as introducing hydraulic losses, facilitating heat transfer between the fluid streams, occupying a larger physical envelope/footprint and inducing thermal stresses in the coupling materials. For example, in a fluid system hydraulic losses can be caused by changes to the flow direction and relatively large changes to the cross-sectional flow area (expansions or restrictions). Hydraulic losses may be undesirable as they can increase the pumping requirements and/or operating costs of a hydraulic system. When circulating coolant through the nuclear fuel channel described above, it can be useful to control the amount of heat transfer between the two coolant flow streams and between the coolant flow streams and the surrounding environment. In couplings or fittings where the two fluid streams are separated by a common conduit wall, the common conduit wall may be subjected to significant thermal stresses. For example, if there is a large temperature difference between the two fluid flows one side of the common conduit wall may be subjected to relatively high temperatures while the opposing side of the common conduit wall is simultaneously subjected to relatively lower temperatures. This may create thermal stresses within the common conduit wall, which may affect the performance and/or lifespan of the coupling. Some piping and/or coupling arrangements that could be configured to switch the positions of the two fluid streams can occupy a larger area than that of an equivalent section of the nested pipes. For example, the piping in a cross-over fitting may have a larger cross-sectional area than the cross-sectional area of the outer pipe in the set of nested pipes. This may require a relatively large clearance between adjacent sets of nested pipes, and may be undesirable in embodiments where physical space is limited.

Referring to FIG. 1, one example of a cross-over fluid coupling 100 includes first and second ends 102 and 104 that are axially spaced apart from each other along a central, coupling axis 106.

Figure 3:
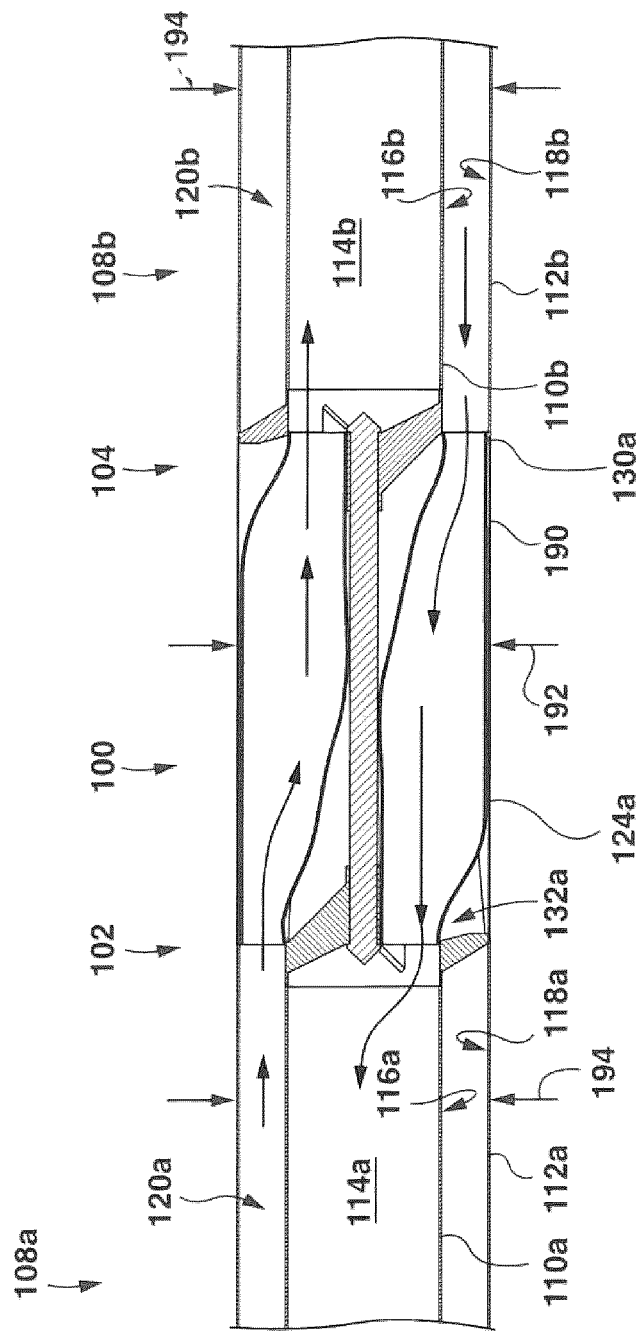
FIG. 3 is an axial cross-sectional view of the cross-over fluid coupling of FIG. 1 connected between two sets of pipes.

The first end 102 of the coupling 100 is configured to be connected to a first set of pipes 108a that includes a first inner pipe 110a and a first outer pipe 112a that at least partially surrounds the first inner pipe 110a. In the illustrated example, both the inner and outer pipes 110a and 112a are cylindrical and the inner pipe 110a is concentrically positioned within the outer pipe 112a. The inner pipe 110a has a cross-sectional area (measured in a plane that is orthogonal to the coupling axis) that defines an inner flow area 114a. Referring also to FIG. 3, the annular area between the outer surface 116 of the inner pipe and the inner surface 118a of the outer pipe 112a defines an outer flow area 120a. When the inner and outer pipes 110a and 112a are concentrically arranged the outer flow area 120a has generally annular or ring like in the configuration. In the illustrated example the inner flow area 114a is approximately equal to the outer flow area 120a.

The second end 104 of the coupling 100 is configured be connected to a second set of pipes 108b, that includes a second inner pipe 110b and a second outer pipe 112b that at least partially surrounds the second inner pipe 110b. As illustrated in FIG. 3, when the coupling 100 is installed between the first and second pipe sets 108a and 108b, the first inner pipe 110a is fluidly connected to the second outer pipe 112b and the second inner pipe 110b is fluidly connected to the first outer pipe 112a.

In this configuration, after flowing through the coupling 100 the fluid that was flowing in the first inner pipe 110a will be flowing in the second outer pipe 112b, and the fluid that was flowing in the second inner pipe 110b will be flowing in the first outer pipe 112a. In the illustrated example the fluid in the first inner pipe 110a is flowing in a different direction than the fluid flowing through the first outer pipe 112a. This can be described as a counter-flow configuration. Alternatively, the fluids flowing in the first inner pipe 110a and the first outer pipe 112a can be flowing in the same direction, which can be described as a co-flow configuration.

Referring to FIG. 3, like the first set of pipes 108a, in the illustrated example, the inner and outer pipes 110b and 112b in the second set of pipes 108b are cylindrical and the inner pipe 110b is concentrically positioned within the outer pipe 112b. The inner pipe 110b has a cross-sectional area (measured in a plane that is orthogonal to the coupling axis) that defines and inner flow area 114b. The annular area between the outer surface 116b of the inner pipe 110b and the inner surface 118b of the outer pipe 112b defines an outer flow area 120b. When the inner and outer pipes 110b and 112b are concentrically arranged the outer flow area 120b is generally annular or ring like in the configuration. In the illustrated example the inner flow area 114b is approximately equal to the outer flow area 120b and is generally equal to the inner flow area 114a. In this illustrated example, the first and second sets of pipes 108a and 108b are generally identical to each other.

Optionally, to help facilitate a fluid connection between the first inner flow 114a area and the second outer flow area 120b, the coupling 100 may include two or more first conduits that extend between the first and second coupling ends and fluidly connect the first inner flow area 114a and the second outer flow area 120b. Similarly, to help facilitate a fluid connection between the first outer flow area 120a and the second inner flow area 114b, the coupling may include two or more second conduits that extend between the first and second coupling ends and fluidly connect the first outer flow area 120a and the second inner flow area 114b. In some embodiments the coupling may include three first conduits and three second conduits. The conduits may be any suitable shape and configuration, and optionally the first and second conduits may be generally identical conduits that are arranged in opposing directions, e.g. second conduits may be oriented 180 degrees relative to the first conduits. Configuring the first and second conduits to be generally identical to each other may help simplify the design of the coupling and may help reduce manufacturing costs by only requiring a single type of conduit to be manufactured. Configuring the first and second conduits to be generally identical to each other may also help facilitate repair of the coupling as the same replacement conduit part may be used to replace either a first conduit or a second conduit. Optionally, instead of three first conduits and three second conduits, the coupling may be configured to have two first conduits or more than three first conduits (e.g. four or more conduits). Similarly, the coupling may be configured to have two second conduits or more than three second conduits (e.g. four or more conduits). The number of first and/or second conduits used may be based on a variety of factors, including the size of the coupling, the shape of the coupling, the materials used and other suitable factors. Optionally, the coupling may have different numbers of first and second conduits.

Figure 2:
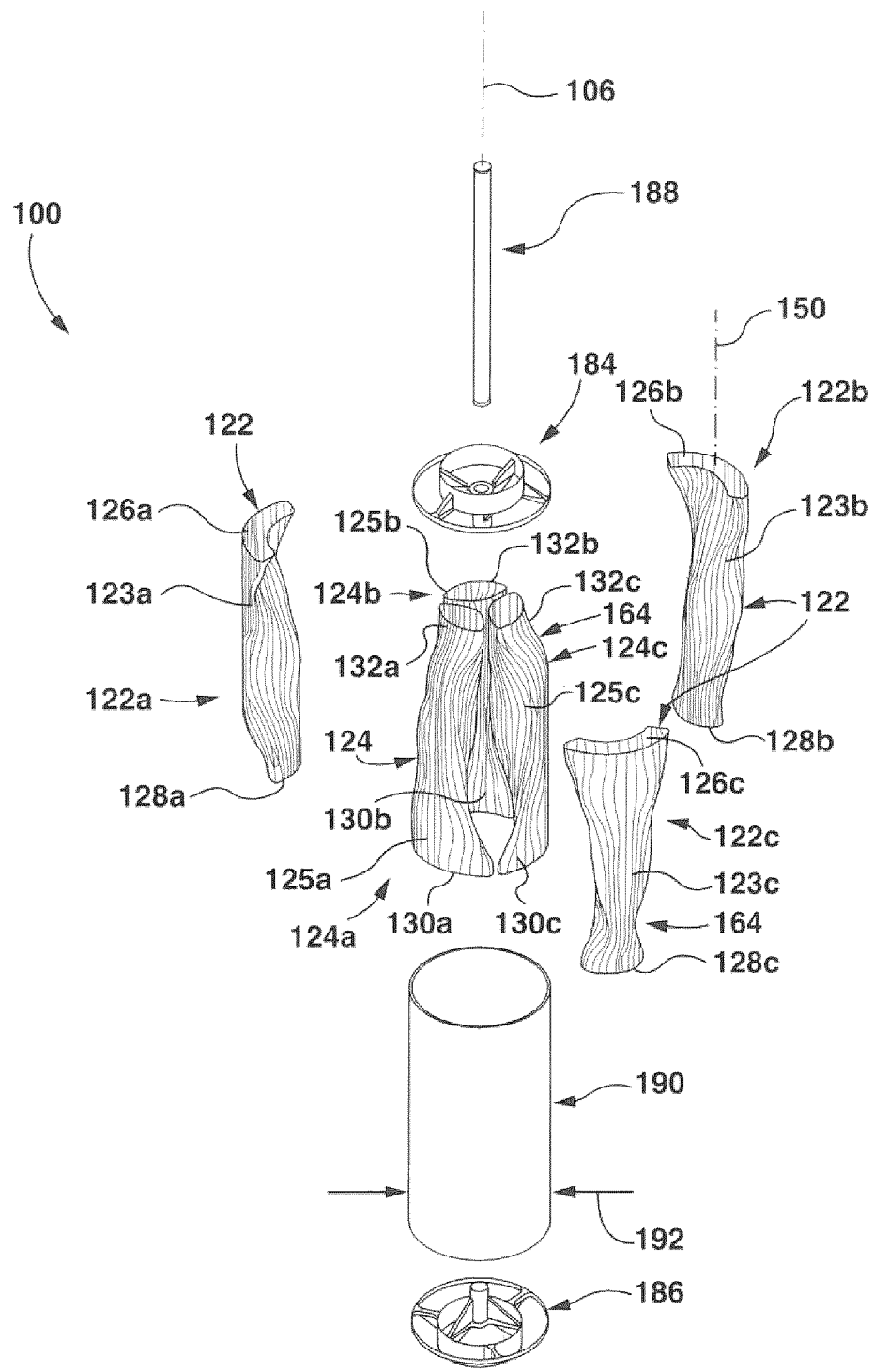
FIG. 2 is an exploded perspective view of the cross-over fluid coupling of FIG. 1.

Referring also to FIG. 2, the coupling 100 is shown in a partially exploded configuration. As illustrated in FIG. 2, the coupling 100 includes three first conduits 122a, 122b and 122c (shown exploded), and three second conduits 124a, 124b and 124c (shown in their assembled, "use" position) extending between the first and second coupling ends 102 and 104. Each first conduit 122 has a laterally inner end 128a, 128b, 128c that is disposed toward the one coupling end 104 and a laterally outer end 126a, 126b, 126c that is axially spaced apart from the respective inner end 128a, 128*b*, 128*c* toward the other coupling end 102 and is located laterally outboard of the inner end 128*a*, 128*b*, 128*c* in a lateral direction that is orthogonal the axial direction (i.e. the radial direction in the example illustrated—see also FIG. 13), Each first conduit 122 also has and a respective sidewall 123*a*, 123*b* and 123*c*. The second conduits 124*a*, 124*b*, and 124*c* also extend between the first coupling end 102 and the second coupling end 104. Each second conduit 124*a*, 124*b*, and 124*c* has a respective laterally outer end 130*a*, 130*b*, and 130*c* that is disposed toward one coupling end 104 and a respective laterally inner end 132*a*, 132*b* and 132*c* that is axially spaced apart from its respective outer end 13*a-c* toward the coupling end 104 and is radially inboard of the respective outer end 130*a-c*, and a respective sidewall 125*a*, 125*b* and 125*c* (FIG. 2).

Figure 5:
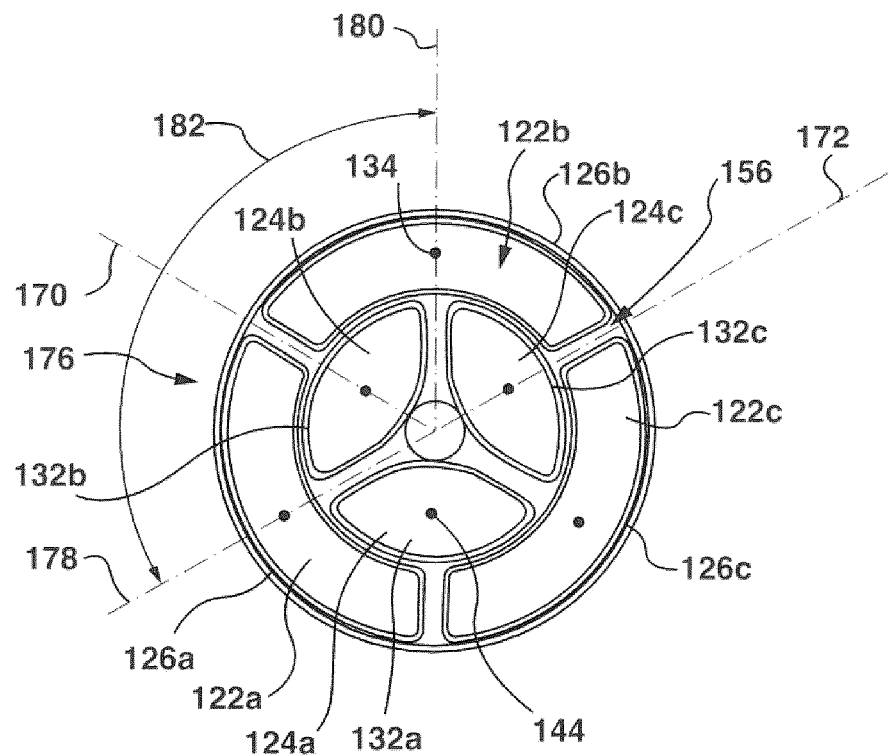
FIG. 5 is an end view of the cross-over fluid coupling of FIG. 4.
Figure 6:
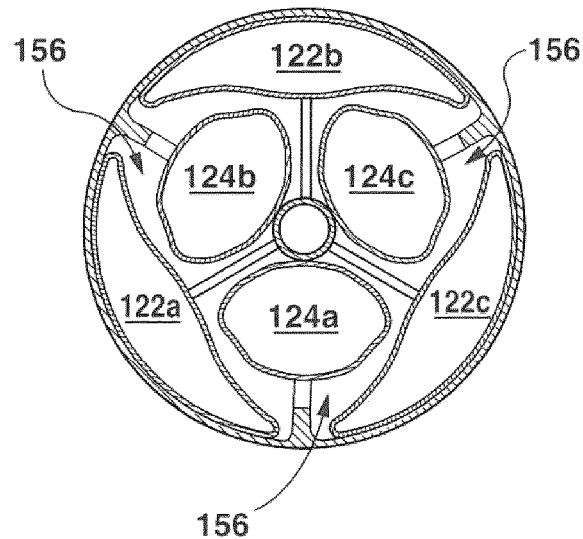
FIG. 6 is a radial cross-sectional view of the cross-over fluid coupling of FIG. 4, taken along line 6-6.
Figure 7:
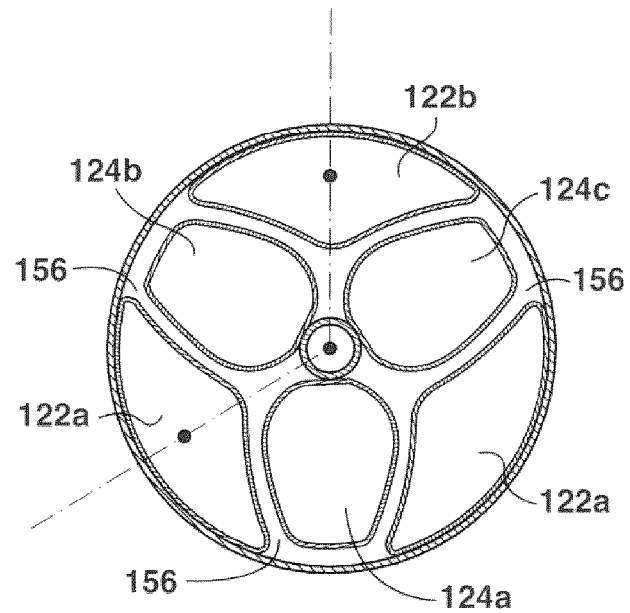
FIG. 7 is a radial cross-sectional view of the cross-over fluid coupling of FIG. 4, taken along line 7-7.
Figure 8:
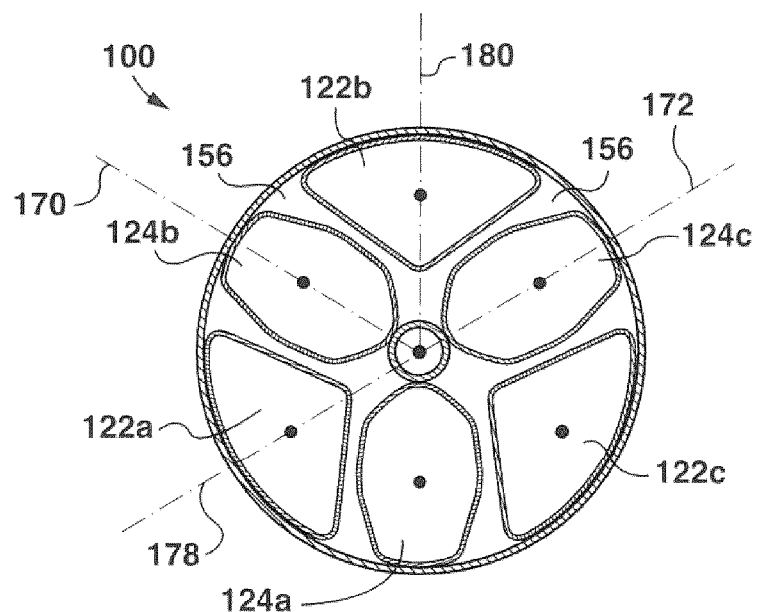
FIG. 8 is a radial cross-sectional view of the cross-over fluid coupling of FIG. 4, taken along line 8-8.
Figure 9:
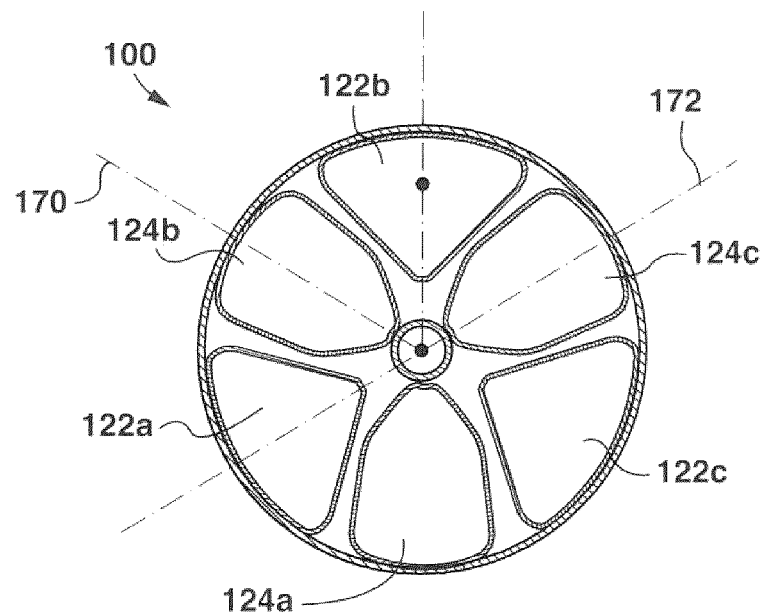
FIG. 9 is a radial cross-sectional view of the cross-over fluid coupling of FIG. 4, taken along line 9-9.
Figure 10:
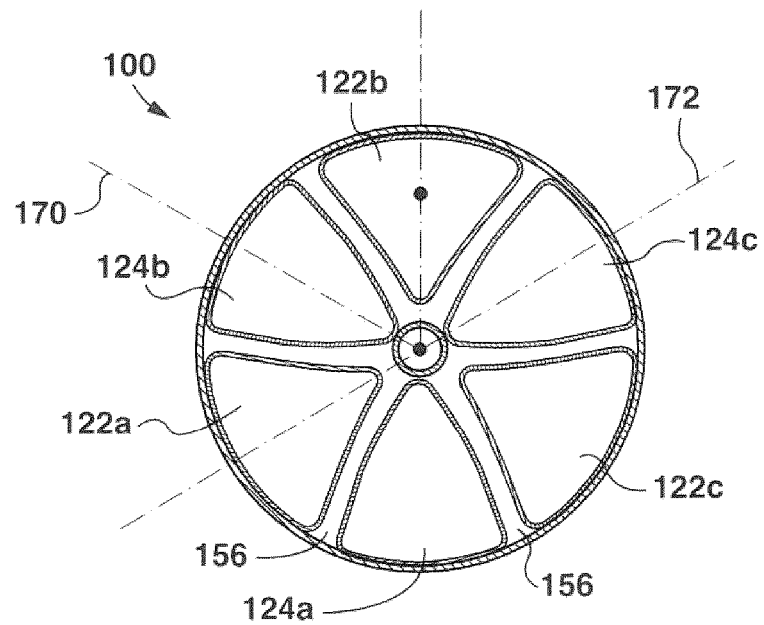
FIG. 10 is a radial cross-sectional view of the cross-over fluid coupling of FIG. 4, taken along line 10-10.
Figure 12:
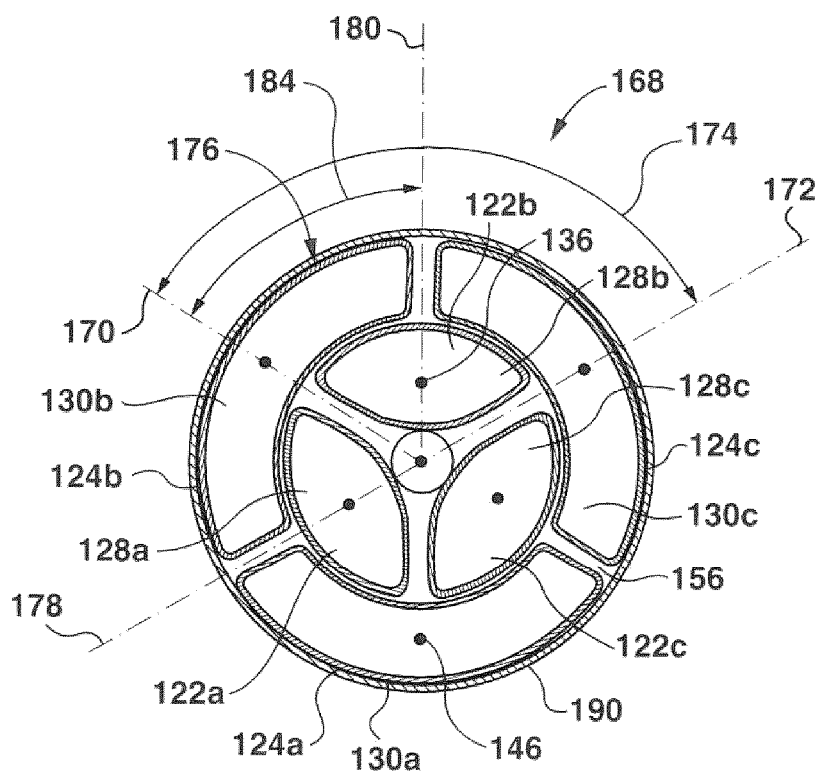
FIG. 12 is an end view of the cross-over fluid coupling of FIG. 4.
Figure 13:
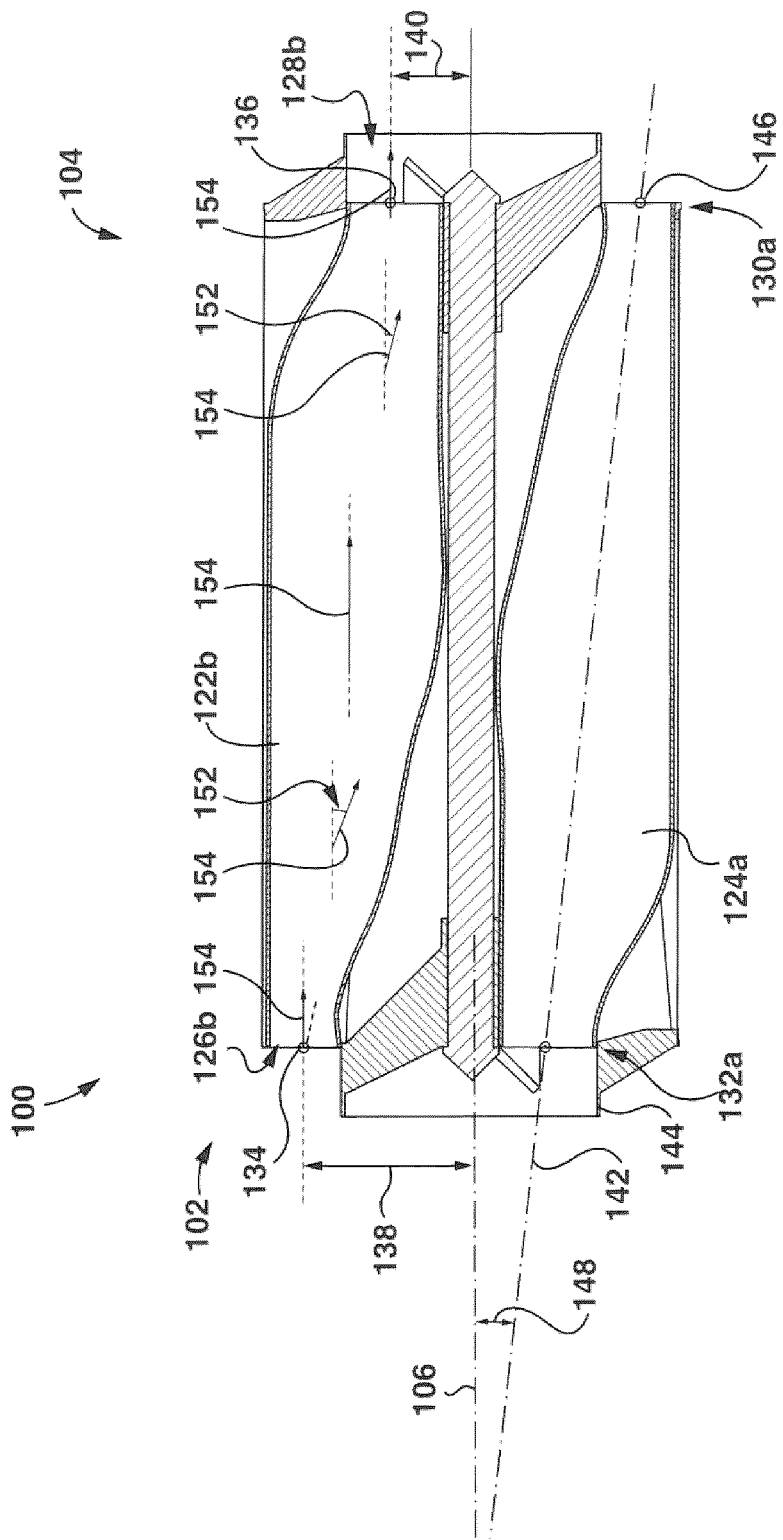
FIG. 13 is an axial cross-sectional view of the cross-over fluid coupling of FIG. 4, taken along line 13-13 in FIG. 4.

Referring to FIGS. 5, 12 and 13, in the illustrated example the inner and outer ends of each of the conduits 122 and 124 define respective geometric centroids (i.e. the centroid of the cross-sectional area of the conduit at its inner and outer ends). By way of example, reference is made to first conduit 122*b* which has a centroid 134 at its outer end 126*b* (FIG. 5), and a centroid 136 at its inner end 128*b* (FIG. 12). Other conduits have analogous centroids. As illustrated in FIG. 13, the centroid 134 at the outer end 126*b* of the conduit 122*b* is located at a first lateral distance 138 from the coupling axis 106 and that the centroid 136 at the inner end 128*b* of the conduit 122*b* is located at a second lateral distance 140 from the coupling axis 106, and the second lateral distance 140 is less than the first lateral distance 138. Optionally, the second lateral distance 140 may be between about 20% and about 60% or more of the first lateral distance 138, and optionally may be between about 30% and about 55%, between about 40% and about 50%, and in the illustrated example is between about 40% and about 45% of the first lateral distance 138.

Optionally, the coupling 100 may be configured so that a straight line extending between the centroids does not intersect the sidewall of the conduit (see FIG. 13). This may be true for some, or all of the conduits 122 and 124. Optionally, the coupling may also be configured so that the line is at an angle relative to the coupling axis that is less than 90 degrees, and optionally is less than about 60 degrees, and may be less than about 45 degrees, less than about 15 degrees and may be about 10 degrees. Referring to FIG. 13, the conduit 124*a* is shown in detail and is configured so that the line 142 extending between the centroids 144 and 146 (see also FIGS. 5 and 12) does not intersect the sidewall 125*a* of the conduit 124*a*, and an angle 148 between the line 142 and the coupling axis 106 is about 10 degrees.

Optionally, as shown in the illustrated example, the coupling 100 can be configured so that fluid flowing into the coupling 100 travels in a direction that is substantially parallel to the coupling axis 106, and that fluid flowing out of the coupling 100 also travels in a direction that is substantially parallel to the coupling axis 106. Referring to FIG. 13, in this configuration, the fluid flowing through the outer end 126*b* of the conduit 122*b* travels in the same direction as fluid flowing through the inner end 128*b* of the conduit 122*b*, and in a direction that is parallel to the coupling axis 106. Configuring the coupling 100 so that it receives fluid flowing in the axial direction and ejects fluid flowing in the axial direction may help facilitate a smooth transition for the fluid flowing from the first pipe set 108*a* into the coupling 100, and for the fluid flowing out of the coupling 100 into the second pipe set 108*b* (or vice versa). This may help reduce turbulence or other types of hydraulic losses as the fluid transitions between the pipe sets 108*a* and 108*b* and the coupling 100.

Referring to FIG. 12 which is end view of the end 104 of the coupling 100 of the coupling 100, in the illustrated configuration in addition to being radially outboard from the inner ends 132*a-c* of the second conduits 124*a-c*, the outer ends 130*a-c* of the second conduits are also radially outboard of the inner ends 128*a-c* of the first conduits 122*a-c*. More specifically, the outer end 130*a-c* of each second conduit 124*a-c* partially laterally surrounds the inner ends of two different first conduits. For example, the outer end 130*a* of conduit 124*a* partially surrounds the inner ends 128*b* and 128*c*, of conduits 122*b* and 122*c* respectively.

Similarly, referring to FIG. 5 which is an end view of the end 102 of the coupling 100 in the illustrated configuration in addition to being radially outboard from the inner ends 128*a-c*, the outer ends 126*a-c* of the first conduits are also radially outboard of the inner ends 132*a-c* of the second conduits 124*a-c*. More specifically, the outer end of one first conduit 122*a-c* partially laterally surrounds the inner ends of two different second conduits. For example, the outer end 126*a* partially surrounds the inner ends 132*a* and 132*b* of second conduits 124*a* and 124*b* respectively.

In this configuration, the inner ends 128*a-c* of the first conduits 122*a-c* are laterally nested between, and generally laterally surrounded by the outer ends 130*a-c* of the second conduits 124*a-c*. Similarly, the inner ends 132*a-c* of the second conduits 124*a-c* are laterally nested between, and generally laterally surrounded by the outer ends 130*a-c* of the first conduits 122*a-c*. Further, in the illustrated example, the inner end 128*a-c* of each first conduit 122*a-c* is laterally surrounded by a combination of the outer ends 130*a-c* of two second conduits 124*a-c*, and the inner end 132*a-c* of each second conduit 124*a-c* is laterally surrounded by a combination of the outer ends 126*a-c* of two first conduits 122*a-c*.

Optionally, some or all of the first and second conduits may be configured as elongate, generally axially extending conduits. In this configuration, the fluids flowing through the first and second conduits may continue to travel in a generally axial direction as it is switched from the inner flow area to the outer flow area (or vice versa), and the fluid flows may be free from 90 degree bends or other relative sharp/significant changes in direction. Reducing the significant changes in direction of the fluids flowing through the first and second conduits may help reduce hydraulic loses as the fluids flow through the coupling.

Referring to FIG. 13, in the illustrated example, the first conduit 122*b* extends substantially along a respective conduit axis 150 (FIG. 2) axially in a direction that is parallel to, but laterally offset from the coupling axis 106. In this configuration a flow direction of the fluid flowing through the first conduit 122*b* is at a flow angle 152 to the conduit axis, and the flow angle is less than 90 degrees. In FIG. 13, the flow direction of fluid in the conduit 122*b* is shown at five representative locations using arrows 154. At some locations, the arrows 154 are at an angle 152 relative to the axial direction. At other locations, such as at the ends 126*b* and 128*b*, the direction of the flow arrow 154 is parallel to the axial direction, such that the angle 152 is 0 degrees. Preferably, the first conduit 122*b* is configured so that the flow direction 154 of the fluid in the first conduit 122*b* remains at an angle 152 between about 0 degrees and about 45 degrees and optionally between about 0 degrees and about 30 degrees relative to the conduit axis 150 at all locations within the first conduit 122b. Some or all of the other conduits 122 and 124 may have an analogous configuration.

Referring to FIG. 5, in the illustrated example the outer ends 126a-c of the first conduits 122a-c are generally arcuate or crescent shaped and co-operate with each other to define generally annular, ring-like outer flow area. In the illustrated example this ring-like outer flow area generally corresponds to the size and shape of the outer flow area 120a of the first set of pipes 108a (see also FIG. 3). Referring also to FIG. 12, the inner ends 128a-c of the first conduits 122a-c cooperate with each other to define a generally circular flow area which, in the example illustrated generally corresponds to the size and shape of the inner flow area 114b of the second set of pipes 108b (see also FIG. 3). The inner and outer ends 132a-c and 130a-c of the second conduits 124a-c have an analogous configuration.

Optionally, as shown in the illustrated example each of the first and second conduits 122a-c and 124a-c may be a separate, independent conduit member having independent sidewalls 123a-c and 125a-c, respectively. Alternatively, some or all of the first and second conduits may be configured so that at least a portion of their sidewalls are shared with an adjacent first conduit, second conduit or other conduit members.

Optionally, some or all of the first and second conduits may be insulated from each other to help reduce heat transfer between adjacent ones of the conduits 122a-c and 124a-c. Insulation may be provided in any suitable manner, including, for example, providing one or more insulators and/or liners inside or between adjacent conduits and by laterally spacing the conduits apart from each other to provide a gap between adjacent conduits.

Referring to FIGS. 5-12, in the illustrated example the coupling 100 is configured so that the first conduits 122a-c are laterally spaced apart from each other and from the second conduits 124a-c. In this configuration, gaps 156 are provided between respective ones of the first and second conduits 122a-c and 124a-c and, in the example illustrated, the gaps 156 are in fluid communication with each other. Optionally, the gaps 156 may be evacuated (i.e. configured as a vacuum) or may be filled with any suitable material that has desired insulating properties. For example, the gaps 156 may be filled with air or another gas, an insulating fluid and/or with a solid insulating material.

Alternatively, instead of insulating adjacent conduits 122a-c and 124a-c, the coupling 100 may be configured to help facilitate heat transfer between the first and second conduits 122a-c and 124a-c (for example if used in a heat exchanger, etc. In such a configuration the gaps 156 may be filled with a thermally conductive material, and/or some or all of the gaps 156 may be eliminated so that some of the first conduits 122a-c are in direct physical contact with adjacent first conduits 122a-c and/or adjacent second conduits 124a-c.

The relative cross-sectional area of the gaps 156, as compared to the combined cross-sectional flow areas of the conduits 122a-c and 123a-c, can vary along the length of the coupling 100 and so that the combined gap cross-sectional area is between about 0% (i.e. the conduit sidewalls touch each other and there is no gap 156) to about 40% or more of the combined cross-sectional areas of the conduits 122a-c and 124a-c (taken in the same plane), and may be between about 5% and about 30% and between about 10% and about 25% of the cross-sectional areas of the conduits 122a-c and 124a-c. Increasing the relative area of the gaps 156 may help increase the insulation between conduits 122a-c and 124a-c, but may reduce the available flow area within the coupling 100. The specific ratio of gap area to flow area may be selected based on a variety of criteria, including, for example, the temperatures of the fluids flowing through the coupling 100, the desired degree of heat transfer between fluid streams, the material of the conduits 122a-c and/or 124a/c, the insulating (or heat transfer) capacity of the material occupying the gaps 156 (if any) and other factors. As illustrated by the sectional views of FIGS. 5-12, in the illustrated example the size and shape of the gaps 156 between the conduits 122a-c and 124a-c varies as the shape and spacing of the conduits 122a-c and 124a-c change along the length of the coupling 100.

Referring to FIGS. 5-12, in the illustrated example, due to the existence of the gaps 156 between adjacent first conduits 122a-c, the combined flow area of all of the inner ends 128a-c of the first conduits 122a-c is less than the inner flow area 114b of the second inner pipe 110b. Optionally, the coupling 100 can be sized so that the combined flow area of the inner ends 128a-c of the first conduits 122a-c can be between about 60% and about 99% of the inner flow area 114b of the 110b inner pipe, and optionally can be between about 80% and about 97% of the inner flow area 114b. Similarly, the combined flow area of the outer ends 126a-c of the first conduits 122a-c is less than the outer flow area 120a of the first set of pipes 108a. Optionally, the coupling 100 can be sized so that the combined flow area of the outer ends 126a-c of the first conduits 122a-c can be between about 60% and about 99% of the outer flow area 120a of the first pipe set 108a, and optionally can be between about 80% and about 97% of the outer flow area 120a. The second conduits 124a-c may have an analogous configuration. In the illustrated example the first and second conduits 122a-c and 124a-c are identical, so the combined flow area of the inner ends 128a-c of the first conduits 122a-c is the same as the combined flow area of the inner ends 132a-c of the second conduits 124a-c, and the combined flow area of the outer ends 126a-c of the first conduits 122a-c is the same as the combined flow area of the outer ends 130a-c of the second conduits 124a-c.

Optionally, the first conduits 122a-c can be configured so that the flow area within each first conduit remains substantially constant between its inner and outer ends 128 and 126. Configuring the first conduits to have substantially constant flow areas along their length (i.e. in the axial direction) may help reduce changes in the flow conditions (i.e. pressure and velocity) for the fluid flowing through the first conduits. In such a configuration, the flow area at the inner end of a first conduit would be the about same as the flow area at the outer end of the first conduit, and at all locations in between. Alternatively, the first conduits may have varying flow areas along their lengths. While varying the flow area may alter the flow conditions within each first conduit, it may help facilitate a desired physical configuration for each first conduit, which may help facilitate the desired positioning of the first conduits within the coupling. The second conduits may have an analogous configuration.

Referring to FIGS. 5-12, as an illustrative example the second conduit 124c has a first cross-sectional area taken in a plane 158 (FIG. 4) that is orthogonal to the axial direction at the first end 102 of the coupling and a second cross-section area taken in a plane 160 (FIG. 4) orthogonal to the axial direction at the second end 104 of the coupling 100. The second conduit 124c also has a third cross-sectional area taken in a plane 162 (FIG. 4, and see FIG. 7) that is positioned between the first and second ends of the coupling 100. Optionally, the coupling 100 can be configured so that the third cross-sectional area is different than at least one of the first cross-sectional area and the second cross-sectional area. In the illustrated example, the second cross-sectional area is different than the first cross-sectional area (in both size and shape) and the third cross-sectional area is a different size and shape than both the both the first and second cross-sectional areas. Optionally, the first cross-sectional area at the inner end of the first conduit can be between about 50% and about 110% of the second cross-sectional area at the outer end of the first conduit, and may be between about 95% and about 105% of the second cross-sectional area.

Referring to FIG. 2, in the illustrated example the third cross-sectional area defines a neck portion 164 of the second conduit 124c and is located closer to the inner end 132c of the second conduit 124c than the outer end 130c of the second conduit 124c. Optionally, the third cross-sectional area can be between about 50% and about 95% of the second cross-sectional area.

In the illustrated example, all of the second conduits have the same configuration as described above, and the first conduits have an analogous configuration, oriented in the opposite direction.

Figure 4:
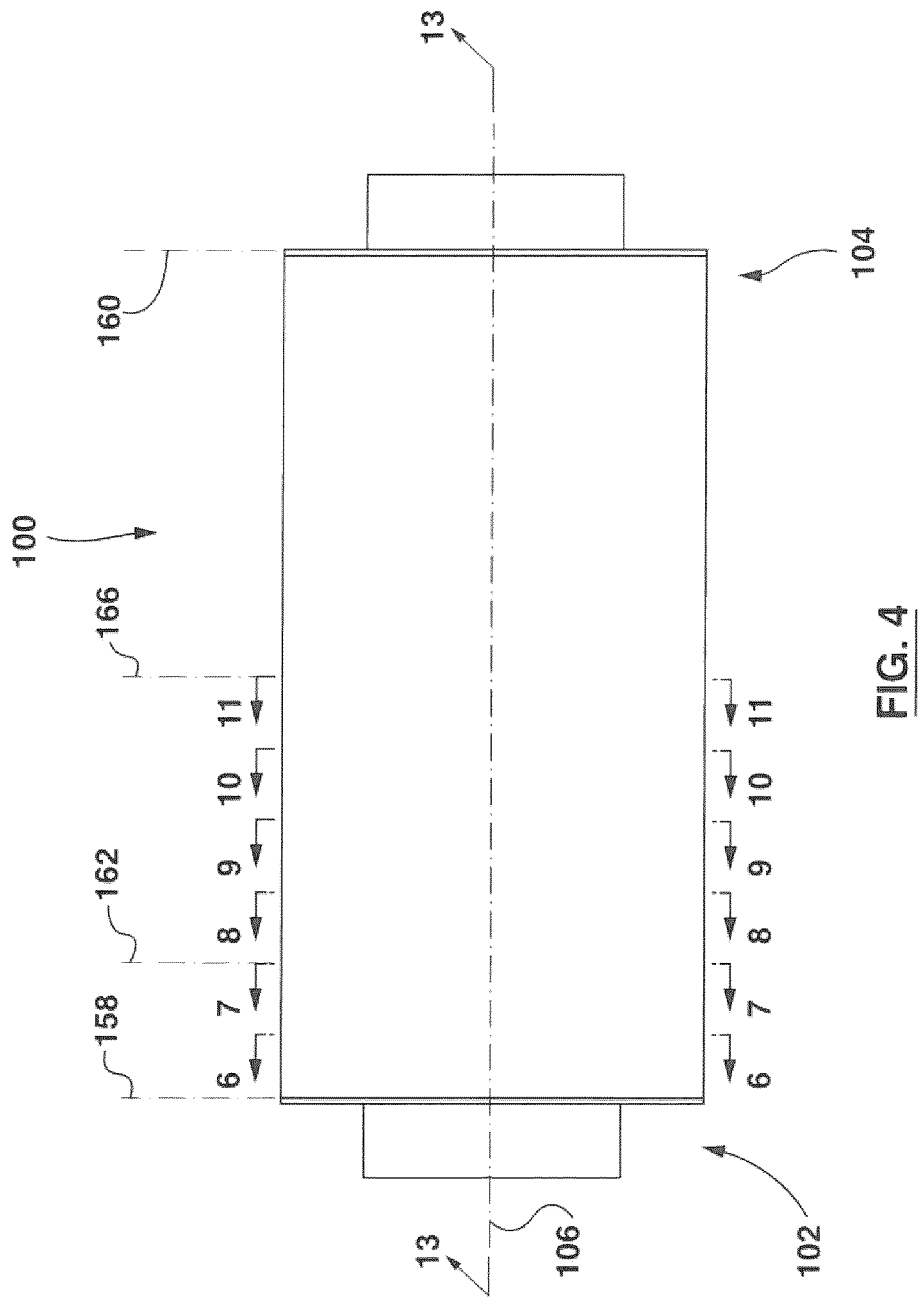
FIG. 4 is a side view of the cross-over fluid coupling of FIG. 1.
Figure 11:
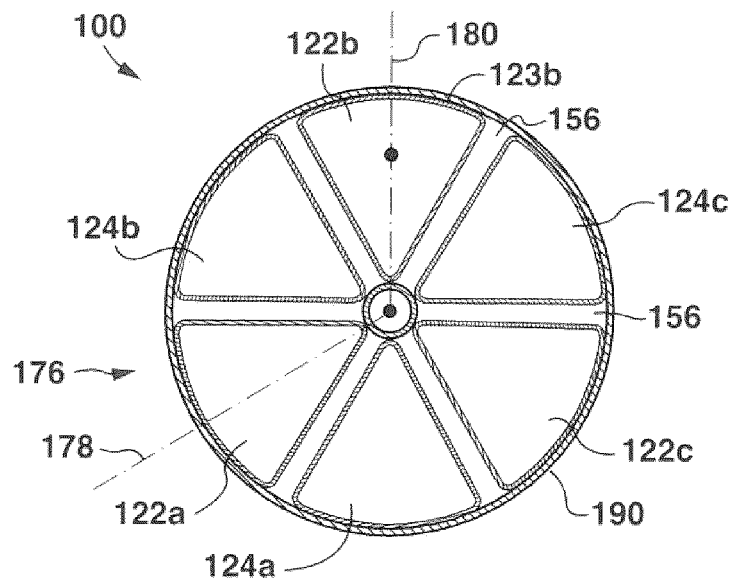
FIG. 11 is a radial cross-sectional view of the cross-over fluid coupling of FIG. 4, taken along line 11-11.

Optionally, the coupling may be configured so that it includes a reference plane that is orthogonal to the axial direction and located between the first coupling end and the second coupling end. Each second conduit 124a-c may define a reference cross-sectional area taken in the reference plane and all of the reference cross-sectional areas of the second conduits 124a-c may be equal to each other. Further, the coupling may be configured so that each first conduit 122a-c also has a respective reference cross-sectional area taken in the reference plane and wherein all of the reference cross-sectional areas of the first conduits 122a-c are equal to each other and are equal to the reference cross-sectional areas of the second conduits 124a-c. Referring to FIGS. 4 and 11, in the illustrated example the coupling 100 the reference plane 166 is centrally located along the length of the coupling and is equally spaced between the first and second coupling ends 102 and 104. In this configuration, the cross-sectional areas of all of the first and second conduits 122a-c and 124a-c are equal (in both size and shape) in the reference plane 166. In other embodiments, the reference plane need not be in the middle of the coupling, but may be provided toward one of the coupling ends.

Optionally, the first and second conduits in the coupling can be generally equally spaced apart from each other around the circumference of the coupling, and each conduit in the coupling can be positioned within a respective sector of the coupling. Sectors of the coupling can be defined as a region bounded by two or more planes that intersect at the coupling axis. In the illustrated example, the planes bounding the sector containing one conduit each include the axis, and centroid of another one of the conduits. Optionally, each conduit can be contained within the same sector along the entire length of the coupling, and both its inner and outer ends can be contained within the same sector. Optionally, the second conduits can be rotationally offset from the first conduits, such that the plane forming the boundary of a sector containing one of the second conduits may intersect one of the first conduits, and vice versa. Configuring each conduit to be contained within a given sector may help facilitate the generally elongate configuration of the conduits and may help facilitate generally axial flow of fluid through the conduit and/or help inhibit rotational/circumferential flow of the fluid within the conduit.

Referring to FIG. 12, in the illustrated example the coupling 100 includes a first sector 168 that is bounded between planes 170 and 172. The planes 170 and 172 intersect at the coupling axis 106. In the example illustrated the sector 168 subtends an angle 174 of about 120 degrees. Alternatively, the angle 174 may be between about 90 degrees and about 180 degrees, or may be any other suitable angle based on the geometry of a given coupling (i.e. based on the number of conduits used, the shape and size of each conduit, such as, for example 360 degrees divided by "n" the number of first or second conduits). For example, in the illustrated embodiment there are n first conduits 122 and n second conduits 124 and the first conduits 122 are substantially identical and the second conduits 124 are substantially identical. In this embodiment, each of the first and second conduits 122 and 124, for a least a major part of the length thereof (i.e. more than 50%)—and optionally along their entire length, is a cross-section in a plane orthogonal to the axial direction and extends through 360/n degrees. That is, the radial and circumferential extent of the first and second conduits 122 and 124 is limited so that they remain with a given sector, and the extent of that sector (i.e. angle 174) can be defined as 360/n degrees which, in the example is 360/3=120 degrees.

Referring to FIG. 12, the inner end 128b of the first conduit 122b is located within the first sector 168, and referring to FIG. 5, the outer end 126b of the first conduit 124b is also located within the first sector 168. Referring to FIGS. 6-11, which illustrate cross-sectional views of the coupling 100 taken a variety of locations along its length, it can be seen that the first conduit 122b remains bounded within the first sector 168 along the entire length of the conduit 100.

As another example, a second sector 176, bounded between planes 178 and 180, is illustrated in FIGS. 5 and 12. The second sector 176 contains the second conduit 124b, and it can be seen in FIGS. 5 and 12 respectively that the outer and inner ends of the second conduit 124b are located within the second sector 176. The angle 182 between the planes 178 and 180 is about 120 degrees.

Referring to FIG. 5, the conduits 122a-c and 124a-c are configured and positioned so that planes 170 and 172 that bound the first sector 168 do not intersect the first conduit 122b, but each plane 170 and 172 does intersect a respective one of the second conduits, 124b and 124c respectively. Specifically, in the illustrated example plane 170 contains the axis and centroid of the outer end 130b of conduit 124b and plane 172 contains the axis and centroid of the outer end 130c of conduit 124c.

Further, in the illustrated example the plane 170 is a plane of symmetry for conduit 124b, and plane 172 is a plane of symmetry for conduit 124c. Similarly, the planes 178 and 180 bounding the second sector 176 do not intersect the second conduit 124b, but do intersect, and are planes of symmetry for, respective ones of the first conduits, 122a and 122b respectively.

The angle between adjacent planes (i.e. between plant 180 and plane 170 as illustrated in FIG. 12) may be any suitable angle, and may be dictated by the relationships of the sectors described herein, for example, it may be based on the relationship between the angles 174 (FIG. 12) and 182 (FIG. 5). In the illustrated example, the planes 170 and 180 intersect each other at an angle 184 (FIG. 12) that is about 60 degrees. In other examples, the angle 184 may be between about 20 and about 90 degrees, or more, depending on the configuration of the conduits. Optionally, the coupling can be configured so that the angle 184 is defined as 180/("n"—the number of first or second conduits) degrees.

That is, in the illustrated example, if there are n first conduits 122 and n second conduits 124, and the conduits are generally equally spaced from each other, the angle 184 between the planes 170 and 180 will be 180/3=60 degrees. Optionally, as in the illustrated example, the intersection angles, such as angle 184, may be half of the sector angles, such as angle 174.

Optionally, the coupling 100 can include any suitable connectors, fasteners, fittings, housing and other pieces of hardware that can help connect the first and second conduits and allow the coupling to interface with the pipe sets. Referring to FIG. 2, in the illustrated example, in addition to the first and second conduits 122a-c and 124a-c the coupling includes a first flange 184, a second flange 186, and a central connecting rod 188 that can co-operate to hold the first and second conduits 122a-c and 124a-c in their desired locations. Because the first and second conduits are identical, the first and second flanges 184 and 186 may also be identical. This can help simplify the manufacturing and assembly of the coupling 100. In the illustrated example, the first flange 184 is configured to engage the inner ends 132a-c of the second conduits 124a-c and the outer ends 126a-c of the first conduits 122a-c. The first flange 184 can inhibit lateral movement, and optionally axial movement, of the first and second conduits 122a-c and 124a-c relative to each other and can help maintain the desired gaps 156 between the conduits 122a-c and 124a-c. The second flange 186 is engages the outer ends 130a-c of the second conduits 124a-c and the inner ends 128a-c of the first conduits 122a-c.

The connecting rod 188 extends axially between the first and second flanges 184 and 186, and is located in the lateral centre of the coupling 100, between the first and second conduits 122a-c and 124a-c. The connecting rod 188 is fastened to the first and second flanges 184 and 186 and helps maintain the desired axial spacing between the flanges 184 and 186. When the connecting rod 188 is fastened to the flanges 184 and 186, the first and second conduits 122a-c and 124a-c are held in place.

Optionally, the connecting rod 188 can be detachably connected to at least one of the first and second flanges 184 and 186 (for example using a threaded fastener). Allowing at least one of the flanges 184 and 186 to be detached from the rod 188 may help facilitate assembly of the coupling 100 and may help facilitate the removal and/or replacement of one or more of the first and second conduits 122a-c and 124a-c when the coupling 100 is in use. Configuring the coupling 100 to allow replacement of an individual conduit 122a-c and 124a-c, instead of requiring replacement of the entire coupling as a unit, may help reduce maintenance costs.

Optionally, the coupling 100 may be provided with an outer shell or housing that surrounds at least some of the first and second conduits. Providing an outer shell may help shield the conduits, and the gaps therebetween, from the surrounding environment. Optionally, the outer shell may be sealed to the pipe sets so that the interior of the coupling is sealed and/or isolated from the surrounding environment. Sealing the coupling in this manner may allow the coupling to have a gas filling the gaps or alternatively to have the gaps filled with a liquid (or other desired fluid), or to have the gaps filled with a solid insulating material. Optionally, the outer shell may include openings, fins or other surface features to help modify the properties (i.e. mechanical properties, heat transfer properties, etc.) of the outer shell and the coupling as a whole.

Referring to FIG. 2, in the illustrated example the coupling includes an outer shell in the form of a generally continuous, tubular sheath 190 that surrounds the conduits 122a-c and 124a-c, flanges 184 and 186 and connecting rod 188. The sheath 190 is generally cylindrical and is sized so that it defines an overall outer diameter/width 192 of the coupling 100. In the illustrated example the sheath 190, and coupling, is sized so that the outer diameter 192 of the sheath is substantially the same as the outer diameter 194 of the first and second outer pipes 112a and 122b (FIG. 3). In this configuration, when the coupling 100 is installed between the first and second pipe sets 108a and 108b the finished pipe system will have substantially the same diameter as the individual pipes 112a and 112b. This may help facilitate placing multiple finished pipe systems in close proximity to each other, for example to conform to the fuel channel spacing requirements in a nuclear reactor which may be driven by external factors (such as the requirements for the fission reaction).

Alternatively, the sheath 190 need not be exactly the same width as the outer pipes 112a and 112b, and instead the coupling 100 may be sized so that it forms a slight bump or slight necked portion in the resulting pipe system while still permitting a desired lateral spacing of the resulting pipe systems.

The coupling 100, including the conduits 122a-c and 124a-c, connecting rod 188, flanges 184 and 186 and sheath 190, can be made from any material that is suitable for the intended application. For example, the coupling 100 may be made from plastic, metal, composite materials, ceramics and any other suitable material. Optionally, the coupling can be made from steel, stainless steel, nickel-based alloys, zirconium alloys, magnesium alloys and other suitable metals. Further, components of the coupling may be made from different materials. For example, the first and second conduits may be formed from metal while the sheath is formed from plastic, or vice versa.

The components of the coupling may each be formed using any suitable fabrication technique. For example, the first and second conduits 122a-c and 124a-c may be hydro-formed, 3D printed, machined, forged, cast or otherwise manufactured to have the desired shapes. The outer sheath 190 may be rolled from sheet metal, extruded or otherwise formed.

While the inner and outer pipes in the pipe sets 108a and 108b are shown as being concentric, the configuration of the cross-over fluid coupling need not be limited to concentrically arranged, circular pipes or conduits. Alternatively, the cross-over fluid coupling may be configured to connect sets of pipes or conduits in which the inner conduit is not co-axial or concentric with the outer conduit, and/or in systems in which the conduits are round/cylindrical, including, for example, conduits that are square, rectangular, triangular, hexagonal/regular polygon. For example, a cross-over fluid coupling could be adapted to connected sets of eccentrically nested square conduits, or other suitable conduit configurations. Optionally, the coupling may be configured so that the number of conduits used is equal to the number of sides that each conduit has.

In non-concentric and/or non-circular conduit configurations the area defined between the outer surface of the inner conduit and the inner surface of the outer conduit may not define an "annular" outer flow area. However, as used herein, the term outer flow area can be used to generally describe the flow area between any inner and outer conduit, whether or not such outer flow area surrounds all of, or only a portion of the outer surface of the inner conduit.

Optionally, the first and second sets of pipes need not be identical to each other. The first set of pipes may be of a different size, shape and/or configuration than the second set of pipes, and the first and second ends of the coupling may be different from each other in order to connect to their respective sets of pipes. For example, the first set of pipes may be concentrically arranged circular tubes, and the second set of pipes may be non-concentrically arranged, non-circular conduits.

Optionally, the first and/or second sets of pipe can be configured so that the inner flow area(s) is not the same as the outer flow area(s), and optionally may be between about 25% and about 200% or more of the outer flow area. Similarly, the first inner flow area need not be the same as the second inner flow area, and optionally may be between about 25% and about 200% or more of the outer flow area. The first outer flow area need not be the same as the second outer flow area, and optionally may be between about 25% and about 200% or more of the outer flow area.

While illustrated as being generally straight coupling, where the first end 102 and second end 104 are aligned on the same axis 106, optionally the coupling 100 need not be straight. Alternatively, the coupling may be curved, twisted or otherwise configured to fit into a desired piping system. For example, the coupling 100 may be configured as an elbow conduit (for example a 45 degree or 90 degree elbow) so that the coupling 100 can help change the direction of the fluid flow, as well as switching the inner and outer flows. In such an embodiment, the first end 102 may be aligned with the first set of pipes, and the second end 103 may be aligned with the second set of pipes and the fluid travelling through the first end 102 may be travelling in a different direction than fluid travelling through the second end 104.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A cross-over fluid coupling comprising:
a first coupling end;
a second coupling end spaced apart from the first coupling end in an axial direction;
a plurality of first conduits extending between the first and second coupling ends and configured to allow fluid to flow through the cross-over fluid coupling, each first conduit having an inner end disposed toward the first coupling end and an outer end spaced apart from the inner end toward the second coupling end in the axial direction and being outboard of the inner end in a lateral direction that is orthogonal the axial direction; and
a plurality of second conduits extending between the first coupling end and the second coupling end and configured to allow fluid to flow through the cross-over fluid coupling, each second conduit having an outer end that is disposed toward the first coupling end and positioned laterally outboard of the inner end of at least one of the first conduits, and an inner end that is spaced apart from the outer end thereof toward the second coupling end in the axial direction and is laterally inboard of the outer end of the at least one of the first conduits.

2. The cross-over fluid coupling of claim 1, wherein the outer end of a first one of the first conduits at least partially surrounds the inner end of a first one of the second conduits.

3. The cross-over fluid coupling of claim 2, wherein the outer end of the first one of the first conduits partially surrounds the inner end of the first one of the second conduits and the inner end of a second one of the second conduits.

4. The cross-over fluid coupling of claim 2, wherein the coupling comprises a central coupling axis and a first plane containing the central coupling axis intersects the first one of the first conduits and does not intersect the first one of the second conduits.

5. The cross-over fluid coupling of claim 4, wherein the first plane is a plane of symmetry for the first one of the first conduits.

6. The cross-over fluid coupling of claim 4, further comprising a second plane containing the central coupling axis, and wherein the second plane intersects the first one of the second conduits and does not intersect the first one of the first conduits.

7. The cross-over fluid coupling of claim 6, wherein the second plane is a plane of symmetry for the first one of the second conduits.

8. The cross-over fluid coupling of claim 6, wherein the second plane intersects the first plane at an intersection angle that is between about 20 degrees and about 90 degrees.

9. The cross-over fluid coupling of claim 8, wherein there are n first conduits and n second conduits, wherein the first conduits are substantially identical and the second conduits are substantially identical, and wherein each of the first and second conduits, for a least a major part of the length thereof, in a cross-section in a plane orthogonal to the axial direction, extends through $360/n$ degrees.

10. The cross-over fluid coupling of claim 9, wherein the intersection angle is $180/n$ degrees.

11. The cross-over fluid coupling of claim 1, wherein:
the inner ends of the plurality of first conduits are nested laterally between the outer ends of the plurality of second conduits;
the inner ends of the plurality of second conduits are nested laterally between the outer ends of the plurality of first conduits; and
the outer end of each second conduit at least partially surrounds the inner ends of at least two of the first conduits, and the outer end of each first conduit at least partially surrounds the inner ends of at least two of the first conduits.

12. The cross-over fluid coupling of claim 1, wherein:
the outer ends of the first and second conduits are each generally arcuate in shape, the outer ends of the first conduits co-operate with each other to define a first generally annular outer ring area, and the outer ends of the second conduits co-operate with each other to define a second generally annular outer ring area; and
the inner ends of the first and second conduits are generally arcuate in shape, the inner ends of the first conduits co-operate with each other to define a first generally circular area, and the inner ends of the second conduits co-operate with each other to define a second generally circular area.

13. The cross-over fluid coupling of claim 1, wherein the plurality of first conduits are substantially identical to each other and to the plurality of second conduits, and wherein the plurality of second conduits are oriented 180 degrees relative to the plurality of first conduits about the axial direction of the coupling.

14. The cross-over fluid coupling of claim 1, further comprising a first flange disposed at the first coupling end and retaining the inner ends of the first conduits and the outer ends of the second conduits, and a second flange disposed at the second coupling end and retaining the outer ends of the first conduits and the inner ends of the second conduits.

15. The cross-over fluid coupling of claim 1, wherein the plurality of first conduits are spaced apart from each other and from the plurality of second conduits whereby gaps are provided between adjacent ones of the first and second conduits.

16. The cross-over fluid coupling of claim 1, further comprising a generally cylindrical outer sheath laterally surrounding the plurality of first conduits and the plurality of second conduits.

17. The cross-over fluid coupling of claim 1, wherein the inner end of a first one of the first conduits has a first cross-sectional area, the outer end of a first one of the second conduits has a second cross-sectional area, and the first cross-sectional area is between about 50% and 110% of the second cross-sectional area.

18. A cross-over fluid coupling for connecting a first set of pipes, having a first inner pipe and a first outer pipe at least partially surrounding the first inner pipe, to a second set of pipes, having a second inner pipe and a second outer pipe at least partially surrounding the second inner pipe, the coupling comprising:
   a first coupling end connectable to the first set of pipes;
   a second coupling end connectable to the second set of pipes and spaced apart from the first coupling end in an axial direction;
   a plurality of first conduits extending between the first and second coupling ends and configured to allow fluid to flow between the first set of pipes and the second set of pipes, each first conduit having a first end fluidly connectable to the first outer pipe and a second end that is spaced apart from the first end toward the second coupling end in the axial direction and is fluidly connectable to the second inner pipe to fluidly connect the first outer pipe to the second inner pipe; and
   a plurality of second conduits extending between the first coupling end and the second coupling end and configured to allow fluid to flow between the first set of pipes and the second set of pipes, each second conduit having a first end that is connectable to the first inner pipe and a second end that is spaced apart from the first end toward the second coupling end in the axial direction and is connectable to the second outer pipe to fluidly connect the first inner pipe to the second outer pipe.

19. The cross-over fluid coupling of claim 18, comprising three first conduits and three second conduits arranged in an alternating configuration with each other.

20. The cross-over fluid coupling of claim 19, wherein the first ends of the first conduits laterally surround the first ends of the second conduits.

21. The cross-over fluid coupling of claim 20, wherein the plurality of first conduits are identical to each other and to the plurality of second conduits, and wherein the second conduits are oriented 180 degrees relative to the first conduits.

22. The cross-over fluid coupling of claim 18, wherein:
   the second ends of the plurality of first conduits co-operate with each other to define a substantially circular second end inner flow area; and
   the second ends of the plurality of second conduits co-operate with each other to define a substantially annular first end outer ring flow area laterally surrounding the second end inner flow area.

23. The cross-over fluid coupling of claim 18, wherein the first ends of the plurality of second conduits co-operate with each other to define a substantially circular first inner flow area and the first ends of the first conduits co-operate with each other to define a generally annular first outer ring flow area surrounding the first inner flow area.

24. The cross-over fluid coupling of claim 18, wherein fluid flowing through one of the first conduits defines a plurality of flow direction vectors at a plurality of locations axially spaced apart from each other along a length of the one of the first conduits, each flow direction vector taken at geometric centre point of the one of the first conduit at each axial location and wherein all of the flow vectors are at an angle of less than about 25 degrees relative to the axial direction.

* * * * *